H. E. MADDEN.
VEGETABLE SLICING AND CUTTING MACHINE.
APPLICATION FILED JULY 27, 1908.

944,491.

Patented Dec. 28, 1909.
2 SHEETS—SHEET 1.

Fig. 2.A.

Witnesses
Carl Stoughton.
A. L. Phelps

Inventor
Harland E. Madden

By C. C. Shepherd.
Attorney

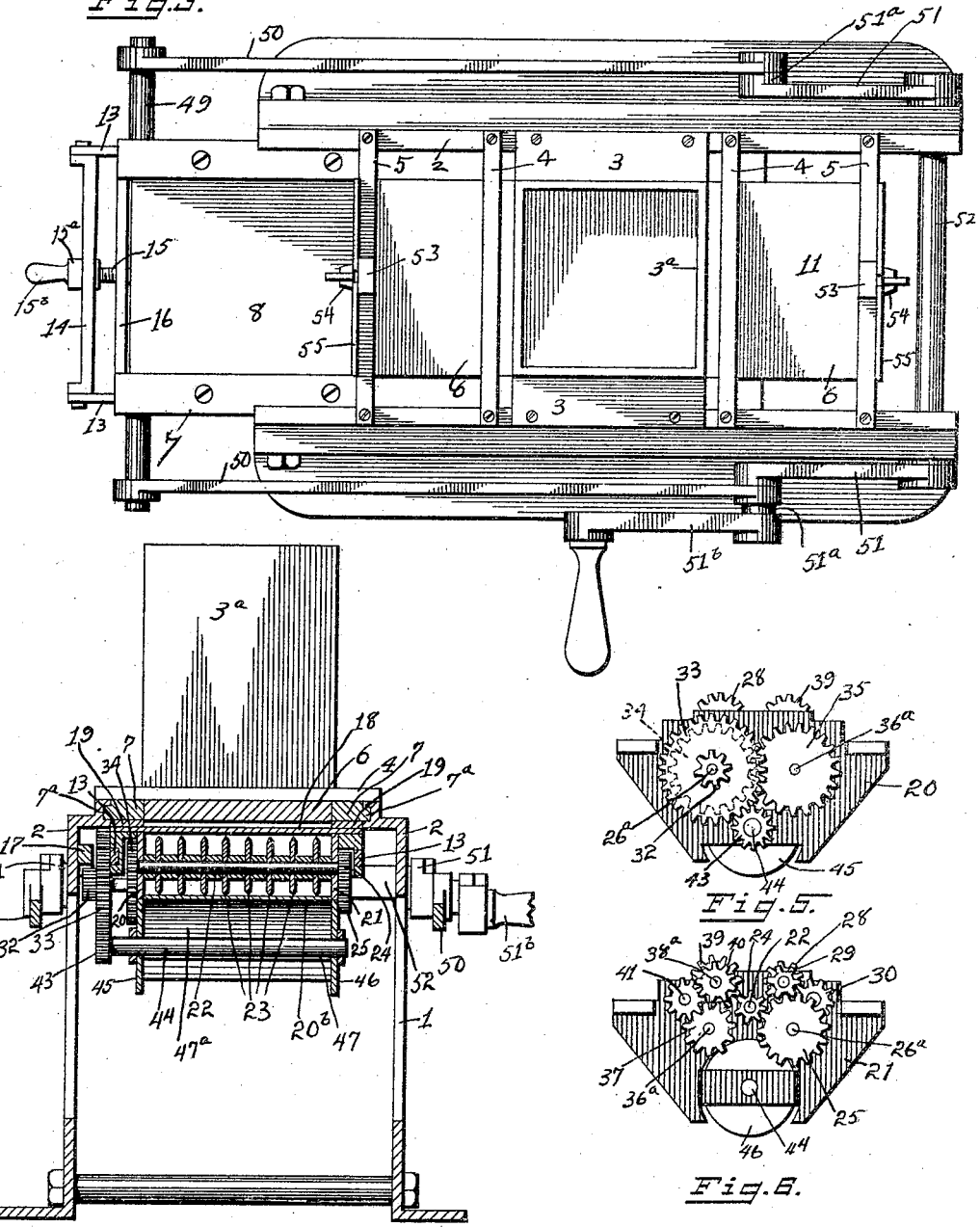

UNITED STATES PATENT OFFICE.

HARLAND E. MADDEN, OF HEBRON, OHIO.

VEGETABLE SLICING AND CUTTING MACHINE.

944,491. Specification of Letters Patent. Patented Dec. 28, 1909.

Application filed July 27, 1908. Serial No. 445,454.

*To all whom it may concern:*

Be it known that I, HARLAND E. MADDEN, a citizen of the United States, residing at Hebron, in the county of Licking and State of Ohio, have invented certain new and useful Improvements in Vegetable Slicing and Cutting Machines, of which the following is a specification.

Figure 1:
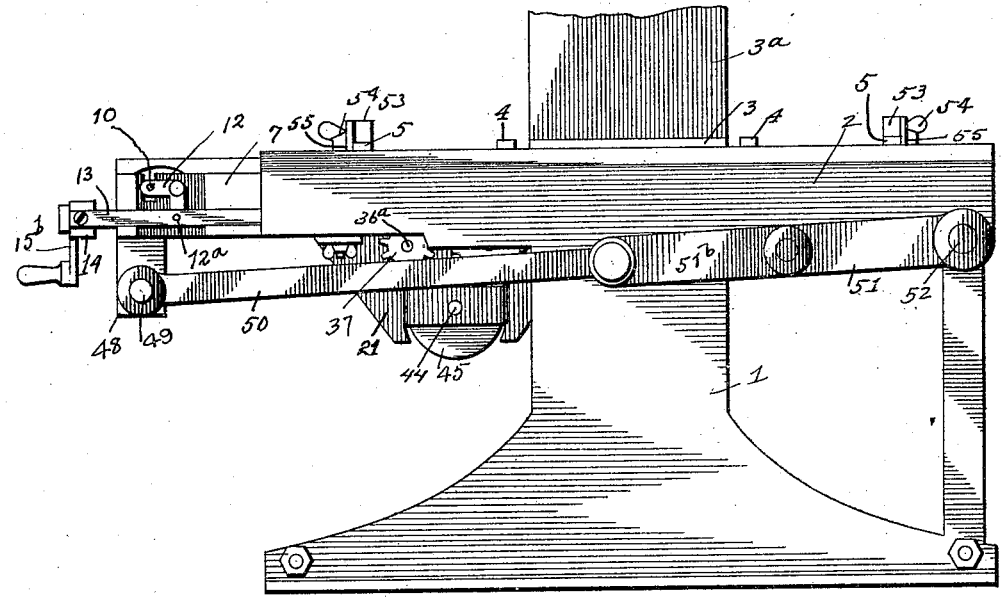
Figure 2:
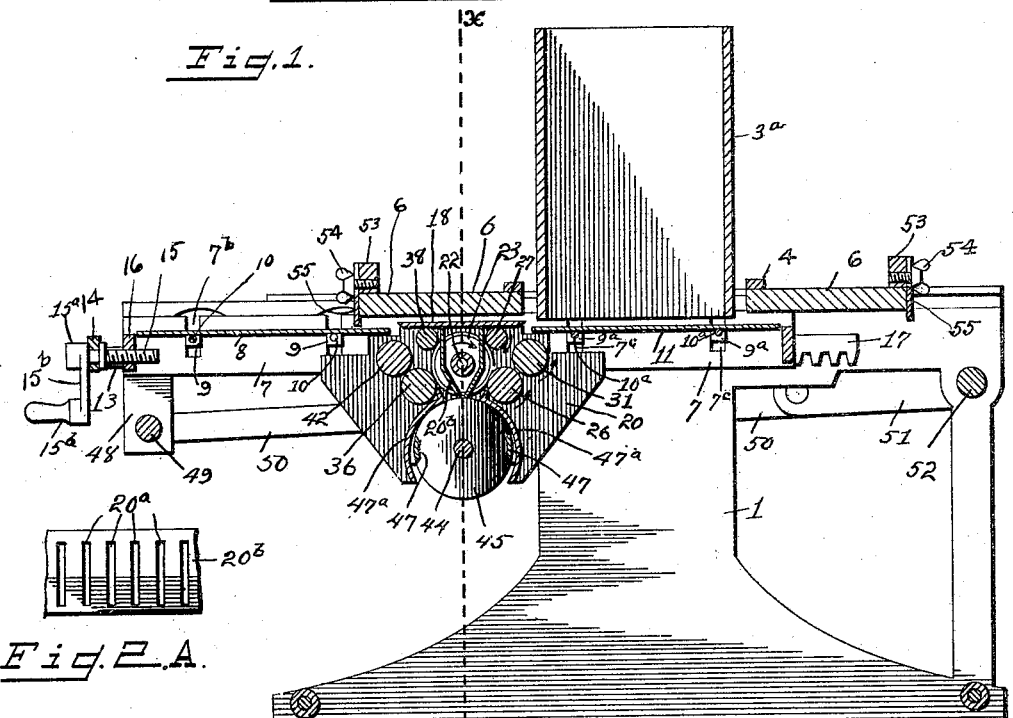

My invention relates to the improvement of vegetable slicing and cutting machines, and the objects of my invention are to provide a machine of this class embodying improved means for rapidly and accurately separating potatoes or other vegetables into slices and desirably shaped sections; to provide improved means for feeding the potatoes to the cutting or separating mechanism and to produce other improvements in details of construction and arrangement of parts which will be more fully pointed out hereinafter. These objects I accomplish in the manner illustrated in the accompanying drawings, in which:

Figure 1 is a side elevation of my improved machine, Fig. 2 is a central longitudinal section of the same, Fig. 2$^A$ is a partial front elevation of a knife guard or cutter casing which I employ in the manner hereinafter described, Fig. 3 is a plan view, Fig. 4 is a transverse section on line $x$—$x$ of Fig. 2, Fig. 5 is an end elevation of the slice feeding and cutting mechanism, and, Fig. 6 is a view in elevation of the opposite end of said feeding and cutting mechanism from that shown in Fig. 5.

Similar numerals refer to similar parts throughout the several views.

In carrying out my invention, I provide a suitable upright supporting frame 1, which comprises in its upper portion horizontal and parallel frame members 2. Connecting the upper sides of the frame members 2 at the centers of their lengths is a plate 3 which has formed therewith an upwardly extending hopper 3$^a$. The frame members 2 are also connected on opposite sides of said hopper, by transverse frame bars 4 and 5 to the underside of each pair of which is affixed a horizontal plate 6.

7 represents parallel knife carrying frame bars, the outer sides of which are provided with tongues 7$^a$ which fit movably in correspondingly shaped grooves in the inner sides of the frame members 2. The upper portions of the bars 7 are thus mounted between the outer longer edge portions of the plates 6 and the frame members 2.

Between the rear portions of the sliding bars 7, I provide a horizontal floor plate 8 which has projecting laterally from opposite sides, short arms or blocks 9, the latter extending within vertical recesses 7$^b$ formed in the upper sides of the bars 7. The blocks of each opposing bar are connected by a rod 10, the ends of which extend outward through the adjacent recesses 7$^b$.

11 represents a second and forward floor plate section, which as prescribed for the plate section 8, has laterally projecting blocks indicated at 9$^a$ which are connected by transverse rods 10$^a$, said blocks extending within vertical recesses 7$^c$ of the bars 7. Each end of each of the rods 10 and 10$^a$ is on the outer side of the bar 7, pivotally connected with one arm of a bell crank lever 12 which is pivoted at the junction of its arms to the outer side of the bar 7. These bell crank levers 12 have their lower arms pivotally connected as indicated at 12$^a$ in Fig. 1 of the drawing, to parallel bars 13 one of which is slidably mounted in a longitudinal recess or way in the lower portion of each of the bars 7, said bars 13 projecting beyond the rear end of the machine, as shown, and being connected by a cross bar 14. In the center of the cross bar is rotatably mounted the handle portion 15$^a$ of a screw 15 which passes through the threaded opening in a fixed cross bar 16 which connects the rear ends of the knife carrying bars 7. The outer end of the screw 15 is provided with a suitable crank handle 15$^b$. Secured to the inner side of one of the frame members 2 is a longitudinal rack bar 17.

18 represents a horizontal slicing plate which extends transversely beneath the rear top plate 6 and which has its rear and forward edges beveled as shown. This slicing plate is carried by the frame members 7, the latter being recessed to receive the outer edges of said cutter plate, as shown more clearly in Fig. 4 of the drawing. Within said recesses and above the marginal portions of the slicing plate, are provided filling strips 19. Secured to the inner sides of the bars 7 are the upper portions of oppositely located depending plates 20 and 21 and between the upper portions of these plates or hangers is journaled a transverse shaft 22 on which are mounted a plurality of separated cutting disks 23. The cutting disks project as shown in Figs. 2 and 2ᴬ of the drawing, through slotted openings 20ᵃ formed in the side walls of the guard body or casing 20ᵇ, which side walls extend on opposite sides of the shaft 22. On the outer side of the hanger plate 21, the shaft 22 carries a pinion 24, the teeth of which mesh with those of a gear wheel 25 carried on one of the end spindles 26ᵃ of a transverse roller 26 which is journaled in the frame hangers 20 and 21. Above the roller 26 is journaled a smaller roller 27 which on the outer side of the plate hanger 21 carries inner and outer connected gear wheels 28 and 29, the teeth of the latter meshing with those of the gear wheel 25 and the teeth of the former, meshing with those of a gear wheel 30 carried on the outer end of a journaled roller 31, which is parallel with and slightly above and to one side of the roller 26. The end spindle 26ᵃ which bears in the plate hanger 20 at the opposite end of the roller 26 carries on its outer end a pinion 32 and on the inner side of said pinion a gear wheel 33. On the inner side of the wheel 33 is carried a gear wheel 34 shown in dotted lines in Fig. 5. The gear wheel 34 gears with a wheel 35 which is carried on an end spindle 36ᵃ of a roller 36 which is journaled between the hanger plates 20 and 21 and on the opposite end of this roller the spindle 36ᵃ carries a gear wheel 37.

38 represents a roller which is journaled between the upper portions of the hanger plates in rear of the cutters 23 and on the outer side of the hanger plate 21, the spindle 38ᵃ of said roller carries inner and outer connected gear wheels 39 and 40, the teeth of the wheel 39 gearing with those of the wheel 37 and the teeth of the wheel 40 gearing with those of a wheel 41 carried on the end spindle of a roller 42 which is also journaled between the plates 20 and 21. The gear wheel 33 gears with a pinion 43 which is carried on the end of a shaft 44 which is journaled in the lower portions of the hanger plates and which shaft carries a cutting device which comprises two disks 45 and 46, the marginal portions of which are connected at opposite points by horizontal cutter bars 47. Extending between the plates 20 and 21 and about the greater portion of said lower cutting device are the curved side walls of a housing 47ᵃ.

The pinion 32 meshes with the teeth of the rack bar 17. Depending from the rear end portions of the bars 7 are hangers 48 in which bears a transverse shaft 49. With each end of the shaft 49 is pivotally connected the rear end of a forwardly extending driving arm 50, the forward end of which is pivotally connected with the crank bend or outwardly projecting portion 51ᵃ of a crank shoe 51, the forward end of which is pivoted on a shaft 52. One of the crank arm projections 51ᵃ is provided with a suitable crank handle 51ᵇ. Upon the upper side and outer portion of each of the fixed frame plates 6, I provide a fixed transverse bar 53 against the outer face of which is secured by means of a set screw 54 a downwardly extending stop plate 55, said set screw passing through a vertically slotted opening in the upper portion of said plate and engaging a threaded opening in said bar 53.

Assuming that the parts are in the positions shown in the drawings, the operation of my slicing and cutting machine is substantially as follows: The potato or other vegetable to be sliced being deposited in the hopper 3ᵃ, a forward traveling motion is imparted to the bars 7 and parts connected therewith, with the result that the forward cutting edge of the horizontal cutting blade 18 engages the lower portion of the potato and in traveling beneath the hopper removes a slice from the potato, which owing to the engagement of the potato with the inner surface of the hopper, is forced rearward and downward between the rollers 31 and 27 and on the inner side of the roller 26. In the forward sliding movement of the cutting mechanism, the bars 7 and their connected parts, it is obvious that rotary motion will be imparted to the pinion 32 through the engagement of the latter with the rack 17 and that through the rotation of said pinion, its shaft and the train of gears operated thereby, it will be understood that rotary movement will be imparted to the rollers 31, 27 and 26 in the directions of the arrows indicated in Fig. 2 of the drawing and that the rollers 38, 42 and 36 will have at the same time imparted thereto, a rotation the reverse of that of the first three rollers mentioned. It is obvious that the rotation imparted to the rollers 27 and 31 will tend to feed the slice severed from the potato as described, downward on the inner side of the roller 26 and against the cutting disks 23, with the result that the slice will be severed into parallel strips which strips will be fed downward between the disks 45 where at each half rotation of said disks, the strips will be cut into suitable lengths by engagement with the horizontal knife bars 47.

A half rotation having been imparted to the crank 51 and the slicing blade 18 having been moved to the outer side of the hopper, a continued rotary movement of the crank will result, as will readily be understood, in a return movement of the traveling parts toward the rear of the machine and that this reverse movement will result through the gear connections heretofore described, in a reversal of the rotation of the feeding rollers, the rotary cutting disks and the disks 45. In the rearward movement of the slicing blades 18, its rear cutting edge will contact with the lower portion of the potato cutting a slice therefrom which will pass downward between the rollers 38 and 42 and on the inner side of the roller 36, the slice thus being subjected as described for the first slice, to the severing action of the disks 23 and to the cutting action of the knife bars 47.

It will be understood that during the slicing operation, the potato will be supported either upon the plate 8 or the plate 11 and that the last slice or remnant of the potato having no engagement with the hopper, may be carried by the moving parts until it contacts with one of the stop plates 55 this contact resulting in forcing said last slice downward between the feeding rollers to the cutters as described for the first slices. In view of the fact that the slicing blade 18 shears against the underside or lower end of the hopper in its traveling movement, it is obvious that the thickness of the slice produced, must depend upon the distance between the lower end of said hopper and the upper surface of the plate 11 or between the lower end of said hopper and the upper surface of the plate 8. I have therefore provided means for imparting a vertical adjustment to said plates 8 and 11, thereby enabling the operator to vary the thickness of the slices produced. This adjustment of said plates 8 and 11 is accomplished by employing the bell crank connections 12 with the sliding bars 13 and the screw 15. It is obvious that by turning said screw inward, thereby moving the bars 13 to forward positions in the bars 7, the upper arms of the bell cranks 12 will be moved downward and by turning the screw outward, said bell crank arms will be moved upward. Owing to the connection of said upper bell crank arms with the plates 8 and 11, said plates may be likewise raised or lowered.

What I claim, is:

1. In a vegetable slicing and cutting machine, the combination with a fixed frame, a movable frame mounted therein, a fixed hopper, and a slicing blade carried by the movable frame, of a rotary cutter journaled beneath the slicing blade and traveling devices adapted to guide the slices from the lower end of the hopper into position to be severed by said rotary cutter.

2. In a vegetable slicing and cutting machine, the combination with a fixed frame, a movable frame mounted to slide therein, a fixed hopper and horizontal floor plates carried by said movable frame below said hopper, of a slicing blade carried by the movable frame between said floor plates, a rotary cutting device below said slicing blade and movable with the movable frame, and means for feeding the slices from beneath the hopper to said rotary cutter.

3. In a vegetable slicing and cutting machine, the combination with a fixed frame, a movable frame mounted therein, a hopper, a slicing blade carried by the movable frame, of a rotary cutter comprising separated cutting disks journaled beneath the slicing blade, traveling devices adapted to guide the slices from the lower end of the hopper into position to be severed by said rotary cutter, and a second rotary cutting device beneath said first mentioned rotary cutter, and having horizontal cutter bars adapted to sever the slices into lengths.

4. In a vegetable slicing and cutting machine, the combination with a fixed frame, a movable frame mounted therein, a fixed hopper, horizontal floor plates carried by said movable frame below said hopper, and means for adjusting said floor plates vertically, of a slicing blade carried by the movable frame between said floor plates, a rotary cutting device below said slicing blade and movable with the movable frame, and a series of rolls arranged on opposite sides of said rotary cutter and adapted to feed the slices from beneath the hopper to said rotary cutter.

5. In a vegetable slicing and cutting machine, the combination with a horizontally movable frame, a rotary cutting device comprising separated cutting disks journaled in said frame, and a horizontal slicing blade surmounting said frame, of rollers journaled on opposite sides of said rotary cutter and adapted to feed a vegetable slice severed from the body of the vegetable by the slicing blade into position to be severed by the blades of said rotary cutting device.

6. In a vegetable slicing and cutting machine, the combination with a reciprocatory member, of a cutting blade carried thereby and adapted to cut slices from vegetables interposed in the path of said blade, rotary cutting members mounted to travel bodily with said frame and beneath said blade, and means for feeding the material cut by said blade to said rotary cutting device.

7. In a vegetable slicing and cutting machine, the combination with a reciprocatory member, of a cutting blade carried thereby and adapted to cut slices from vegetables interposed in the path of said blade, rotary cutting members mounted to travel bodily with said frame and beneath said blade, means for feeding the material cut by said blade, to said rotary cutting device, and means for actuating said rotary cutting device by the movement of the frame.

8. In a veegtable slicing and cutting machine, the combination with a reciprocatory member, of a cutting blade carried thereby and adapted to cut slices from vegetables interposed in the path of said blade, rotary cutting members mounted to travel bodily with said frame and beneath said blade, means for feeding the material cut by said blade, to said rotary cutting device, and means for actuating said rotary cutting device by the movement of the frame, said means comprising a fixed rack and a gear connection between said rack and said rotary cutting member.

9. In a vegetable slicing and cutting machine, the combination with a horizontal slicing blade fixed in a framework, of rotary spaced cutting disks mounted beneath said slicing blade, and means for feeding the material cut by said horizontal blade to said rotary cutter.

10. In a vegetable slicing and cutting machine, the combination with a fixed frame and a movable frame therein, a hopper above said fixed frame, a slicing blade carried by the movable frame, means for bringing the slicing blade in contact with the vegetables in order to cut a slice therefrom, of a gang of cutting disks mounted beneath and upon the movable frame so arranged that a slice cut by the slicing blade will be cut by said disks into strips, a rotary cutter mounted upon the movable frame designed to cut said strips into lengths, and means for imparting a rotary motion to said disks and said rotary cutter.

11. In a vegetable slicing and cutting machine, the combination with a horizontal slicing blade fixed in a framework, of a plurality of rotary spaced cutting disks mounted upon a shaft beneath said slicing blade, said shaft being parallel with the cutting edge of said horizontal slicing blade, and a second rotary cutter mounted upon said framework adapted to cut the slices into lengths.

In testimony whereof I affix my signature in presence of two witnesses.

HARLAND E. MADDEN.

Witnesses:
C. C. SHEPHERD,
A. L. PHELPS.